Sept. 3, 1935.  T. W. VARLEY  2,013,321
ELECTRIC MEASURING INSTRUMENT
Original Filed Aug. 20, 1932
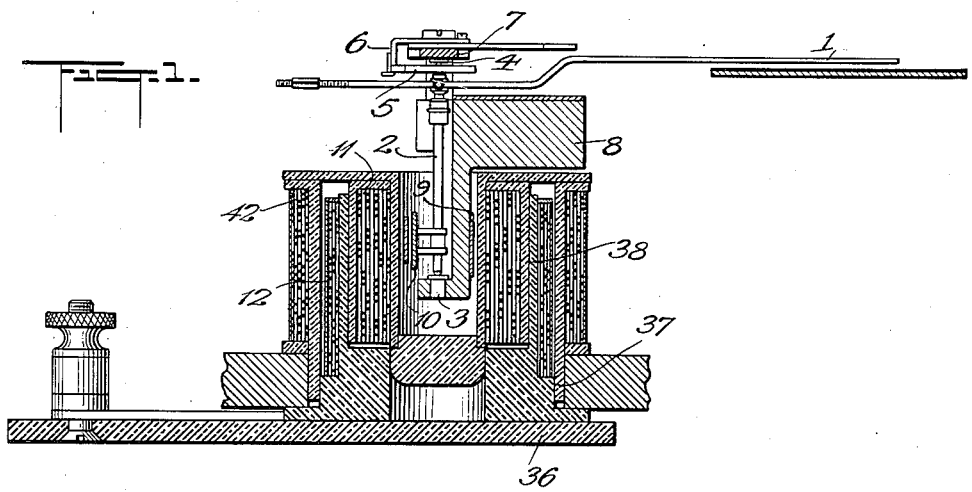
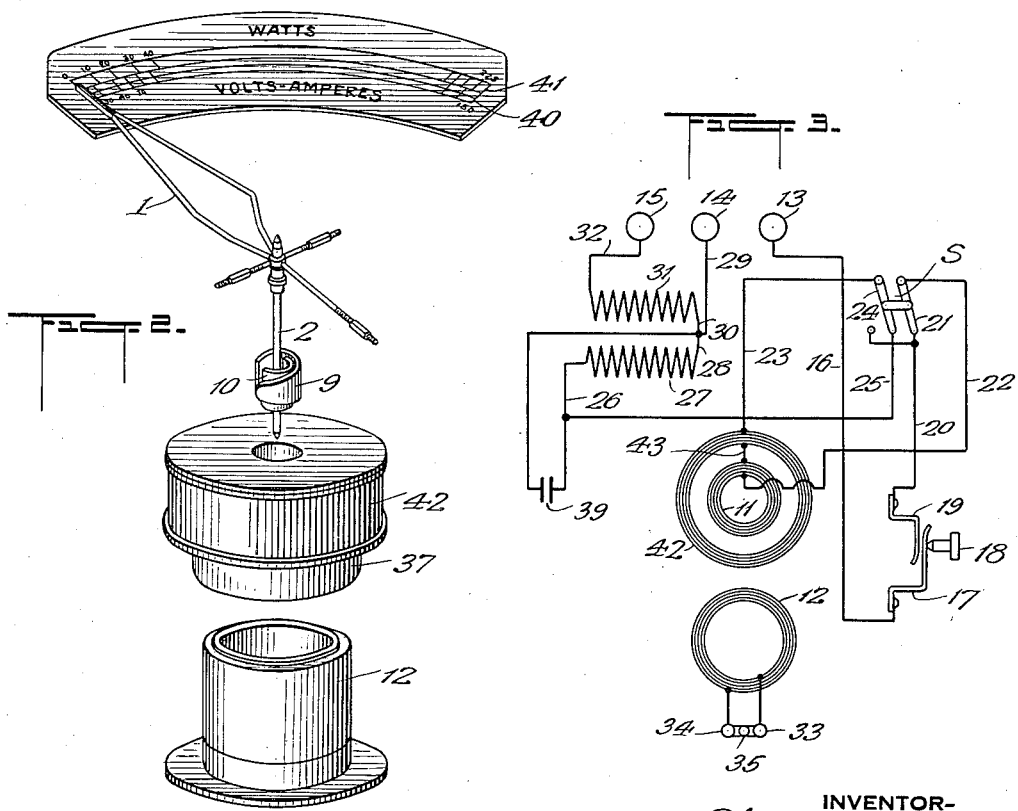
INVENTOR-
Thomas W. Varley
BY
Lyman E. Dodge
ATTORNEY- Patented Sept. 3, 1935

2,013,321

UNITED STATES PATENT OFFICE 2,013,321

ELECTRIC MEASURING INSTRUMENT

Thomas W. Varley, New York, N. Y.

Application August 20, 1932, Serial No. 629,585
Renewed January 18, 1934

5 Claims. (Cl. 171—95)

This invention relates to electricity, especially to the measurement thereof, and more particularly to measurements for ascertaining the value of the volts, amperes, and watts.

A principal object of applicant's invention is to provide a single instrument by means of which, within its capacity, the value of the volts, the amperes, and the watts, of either an alternating current circuit or a direct current circuit may be ascertained.

A further object of applicant's invention is to provide an instrument of the type specified which is so constructed and arranged that the capacity of the instrument, like well known and commonly used instruments, may be arranged with a minimum of parts to provide a full scale reading for various ranges of voltage, and may also be provided with simple substantial alternative parts, easily manipulated, adapting the instrument for full scale reading for various ranges of value of amperes, and consequently, due to the construction of the instrument, for various ranges of value of watts.

Other objects and advantages will appear as the description of the particular physical embodiments selected to illustrate the invention progresses, and the novel features will be particularly pointed out in the appended claims.

The invention in its broader aspects comprises juxtaposed volts, amperes, and watts scales over which a pivoted pointer sweeps. The sweep of the pivoted pointer is caused by a movement of a small soft iron cylindrical segment positioned closely adjacent a curved tongue of soft iron concentric therewith. Both bodies of iron are positioned within the interior of two concentric wire coils, one a potential coil, to be connected across a circuit; the other, a current coil to be connected in series with a circuit. When the potential coil only is connected across a circuit the instrument registers volts. When the current coil only is connected in series with a circuit the instrument registers amperes. When both coils are connected, the potential coil, across a circuit; the current coil, in series with the same circuit, the pointer registers one value of the watts when current passes through the potential coil in one direction and another value when the current passes through the potential coil in an opposite direction. The difference between the two values so registered is the actual watts expended in the measured circuit.

In describing the invention in detail and the particular physical embodiment selected to illustrate the invention, reference is had to the accompanying drawing and the several views thereon, in which like characters of reference designate like parts throughout the several views, and in which:

Figure 1 is a fragmentary cross-sectional elevational view of an electric measuring instrument embodying my invention; Fig. 2 is an exploded view of the operating parts, as shown in Fig. 1; Fig. 3 is a schematic view illustrating a preferred arrangement of circuits for the parts, as illustrated by Fig. 1.

The construction of all of the moving parts of applicant's measuring instrument are old and well known and are found in thousands of measuring instruments in use at the present day, so that no novelty for those parts, per se, is claimed.

The movable parts include generally a pointer 1, attached to a vertical spindle 2, provided with an appropriate lower bearing 3 and upper bearing 4. The zero position of the pointer 1, and resistance to turning of the spindle 2 is provided for by the spiral spring 5, one end of which is attached to the spindle 2 and the other end through pivoted adjustable lever 6 to the stationary support 7.

A fixed member 8 supports a curved tongue 9 made of soft iron. Cooperating with the curved tongue 9 is a segmental body of soft iron 10 attached to the spindle 2.

A magnetic flux, generated so as to pass through the space within which the members 9 and 10 are positioned, causes, in accordance with well understood theory, due to the cooperative action of the members 9 and 10, a rotation of spindle 2 and a resultant sweep of pointer 1.

The magnetic flux influencing the members 9 and 10 may be generated by current flowing in a hollow coil 11 surrounding the spindle 2, and by current flowing in another coil 12 concentric with coil 11, and either inside or outside of the coil 11. In the particular construction illustrated, coil 12 is shown as being outside of the coil 11.

All of the constructions hereinbefore described, with the exception of the second coil 12, are old and well known, thoroughly well understood in the art, and embodied in thousands of instruments now in use.

In addition to the coils 11 and 12 applicant also has another coil 42 positioned outside of coil 12.

The arrangement of the circuits is shown schematically in Fig. 3. The common binding post for the potential coil is designated 13. The binding post 14 is used when a range of from say 0–150 volts is to be measured. The binding post 15 is used when the voltage range is from say, 0–300.

Wire 16 connects the binding post 13 with one side 17 of a push button which is normally open. When the push button is depressed by pushing the button 18, member 17 contacts with member 19 and the current then flows by means of wire 20 to one contact of the pole changing switch designated as a whole by S, then by arm 21 to wire 22, coil 11, wire 43, coil 42, wire 23, one end of contact arm 24, contact arm 24, wire 25, wire 26, resistance 27, wire 28 and wire 29 to the 150 volt range binding post 14. If the 300 volt range binding post 15 is used the circuit would be from wire 28 to wire 30 resistance 31 and wire 32 to binding post 15.

If applicant's electric measuring instrument were connected across a circuit by means of binding posts 13 and 14 or by means of binding posts 13 and 15, the difference of potential between the connected points would be indicated by the pointer 1 on the volts scale 40 when the push button 18 is depressed. Such measurement and the means used therefor are all old and well known and embodied in instruments now extensively used.

In order to determine the number of amperes flowing in a circuit, coil 12 is connected in series with the circuit by connecting one terminal of the circuit to binding post 33, and the other terminal to binding post 34, and then removing the metallic plug 35 connecting the binding posts 33 and 34. The magnetic flux generated by the coil 12 acts just as does the magnetic flux generated by the coil 11, in that the members 9 and 10 are similarly affected so as to cause a sweep of the pointer 1 of the ampere scale 40.

If it is desired to determine the value of the watts in a circuit the instrument is connected across the circuit by means of the common binding posts 13, 14 or 15 depending upon which is appropriate, and the coil 12 is connected in series with the same circuit, the plug 35 removed, and the push button 18 depressed. A movement of the pointer 1 would be caused which would be read upon the watts scale 41. This should be preserved either mentally or otherwise. After this reading has been made another reading is made, but before making another reading, the pole changing switch S is changed to the other position so that the current flows through the coils 11 and 42 in a reversed direction. If a reading is made after depressing the button 18 another value of watts will be registered upon the watts scale. The difference between the two readings is then ascertained by arithmetical computation and the result is the actual watts of the circuit.

It is, of course, understood that reversing switch S may be dispensed with as the leads to binding posts 13 and 14 or 13 and 15 may be reversed when desired to obtain proper reversal of current flow through coils 11 and 42.

It is also to be understood that although applicant prefers to reverse the current flow in coils 11 and 42 when taking readings for watts, nevertheless, the same result may be obtained by reversing the current flow in coil 12.

The capacity of applicant's measuring instrument in amperes is determined by the coil 12, that is, the ampere turns of the coil 12. In order to have the instrument applicable to the measurement of circuits widely varying in amount of amperes flowing therein, applicant prefers to have the coil 12 removable and replaceable by another coil or coils rather than to have it fixed, so that the instrument has only one range of capacities for a full scale reading of amperes. To this end applicant prefers to mount the coil 12 upon a base 36 of insulating material, and to provide an insulating tube or shell 37 cooperating with a hollow core 38 upon which core the coil 12 is formed. By this construction the coil 12 may be accurately and precisely positioned in relation to the members 9 and 10. By having a plurality of coils, such as 12, of various turns the capacity of the instrument for measuring amperes may be varied within very wide limits by selecting the appropriate coil for insertion in the hollow shell 37.

Applicant's measuring instrument may be used for measuring the factors of a direct current circuit and also for measuring the factors of an alternating current circuit, and to the end that the instrument may as a whole not offer an undesirable inductance to an alternating current circuit the condenser 39 is bridged across the resistance 27.

As applicant's electric measuring instrument is particularly designed for the use of electrical inspectors in the field, and particularly power company electrical inspectors of factories purchasing electrical energy from the power company, and as various factories within an inspector's district require immensely varying quantities of current flow and so necessitate the carrying about of a multiplicity of coils such as 12, applicant purposes to permanently install a coil, such as 12, appropriate to the particular situation, in each of the factories to be inspected. This coil may be left permanently connected in series with the factory circuit. When it is desired to make a measurement, the plug, such as 35, is removed and measurements are then made in the usual manner after placing the instrument properly in position over the coil 12.

Applicant's device provides in one instrument means for ascertaining substantially all of the information needed by a power company in regard to the consumption of power by a customer. It directly registers the volts and the amperes and by a simple arithmetical subtraction indicates the watts. From these quantities the power factor of an alternating current circuit may be immediately obtained by a simple ratio and this ratio points directly and quantitatively to the power factor of the circuit measured. Instead of carrying three instruments, a voltmeter, an ammeter, and a wattmeter, as is now usual, an inspector or a field engineer needs to carry one instrument only together with a few small coils, such as 12, of various ampere-turns, such that some one will adapt the instrument for the particular circuit being tested, while in a case where one capacity of instrument only is desired a coil such as 12 may be permanently mounted in the instrument.

The main principle upon which applicant's measuring instrument depends is that the movement of the pointer is dependent upon the square of the energy supplied to the device. It is well known that in an instrument of the type described the movement of the pointer varies as $(iT)^2$, where $i$ is the current flowing in one of the coils surrounding the spindle, and $T$ is the number of turns of wire in the coil. This being so, if the potential coil is used the torque of the pointer varies as $E^2$ where $E$ designates the electro-motive-force of the source of potential. If the current coil is being used, then the movement of the pointer or the torque moving the same varies as $I^2$, where I designates the current flowing in the circuit being measured. If both current and potential coils are used together then the torque will vary as the sum or difference squared, that is, as $(E+I)^2$ or $(E-I)^2$. When E and I are to be added, as in the case of an alternating current circuit they must be added vectorially in order to make correction for any phase displacement and the mathematical statement then becomes $(E+I \times \cos a)^2$ and/or $(E-I \times \cos a)^2$, where $a$ designates the phase displacement angle. If these two statements are subtracted the result is $4EI \cos a$. It is apparent that $EI \cos a$ is equal to the actual watts of a circuit and it is that quantity which applicant obtains by subtracting the two readings of the watt scale when both coils are connected in a circuit, the potential coil across the circuit, and the current coil in series therewith. One reading is obtained when the effects of the coils are additive, and the other reading when the effects of the coils are subtractive. The constant 4 which appears from the subtraction of the two mathematical statements is eliminated by the proper calibration of the instrument.

As an inaccuracy might well be developed when measuring watts of an A. C. circuit applicant has provided the coil 42. This coil is to compensate, or neutralize, or nullify the effect of induction between the coils 11 and 12 when both are connected as in reading watts. Under such conditions the coil 12 in addition to its own proper action upon members 9 and 10, also has an action upon coil 11 which causes coil 11 to in turn have an action upon members 9 and 10 with the result that a proper action of the pointer is not obtained. To obviate this defect, appearing when alternating current is used, coil 42 is used. It is wound with the proper number of turns in the proper direction so that the action upon it by coil 12 is in effect just opposite to the action of coil 12 upon coil 11 so that the two coils 42 and 11 being connected in series the net effect of coil 12 is zero, that is, the coil 42 may be called a generator of an E. M. F. counter to an E. M. F. generated in coil 11 by current in coil 12.

By placing the coil 42 on the outside of coil 12 applicant is enabled to use a coil of few turns. Furthermore, coil 42, being placed at a considerable distance from 9 and 10 has an inappreciable effect thereon because of the small number of turns.

Although applicant has particularly described one particular physical embodiment of his invention, and explained the principle, construction and mode of operation thereof, nevertheless, it is desired to have it understood that the form selected is merely illustrative but does not exhaust the possible physical embodiments of the idea of means underlying the invention.

What I claim as new and desire to secure by Letters Patent of the United States, is:

1. An electric measuring instrument, in combination: a potential coil; a current coil; a rotatable spindle; means for causing the rotatable spindle to rotate by a magnetic flux generated by each of the said coils; a third coil, said third coil positioned outside of both of the first mentioned coils and connected in series with the first mentioned coil in such wise that an E. M. F. generated therein by the second mentioned coil will oppose an E. M. F. generated in the first mentioned coil by the the second mentioned coil; a pointer attached to the rotatable spindle; means predeterminately restraining movement of the pointer whereby when the potential coil is connected across a source of potential and the current coil is connected in series with the source of potential the pointer moves a certain amount and a certain other amount when the connections to either the potential coil or the current coil are reversed and the difference between the amounts of the two movements indicates the actual watts in the circuit.

2. In an electric measuring instrument, in combination: a potential coil, a current coil; a rotatable spindle; means for causing the rotatable spindle to rotate by a magnetic flux generated by each of the said coils; a pointer attached to the rotatable spindle; means predeterminately restraining movement of the pointer; and means for nullifying the effect on the first of said means caused by an E. M. F. generated in the potential coil by current flowing in the current coil.

3. An electric measuring instrument, in combination: a voltage coil; a stationary current coil; a rotatable spindle; means for causing the rotatable spindle to rotate by a magnetic flux generated by each of the said coils; a pointer attached to the rotatable spindle; a watts scale positioned to cooperate with the pointer; means predeterminately restraining movement of the pointer whereby when the voltage coil is connected across a source of potential and the current coil is connected in series with the source of potential the pointer moves a certain amount, and a certain other amount when the connections to one of the coils are reversed and the difference between the amounts of the two movements indicates actual watts in the circuit.

4. An electric measuring instrument, in combination: a rotatable spindle; a pointer attached to the rotatable spindle; means including a stationary voltage coil, a stationary current coil, and a reversing switch in the circuit of one coil whereby volts and amperes may be measured directly and watts by ascertaining two values in either a direct current or an alternating current circuit and then subtracting those two values.

5. The method of ascertaining the actual watts in a circuit which consists in exhibiting the difference of the vector sum of the E. M. F. and the amperes squared and the vector difference of the E. M. F. and the amperes squared and then subtracting those two values.

THOMAS W. VARLEY.